Fig. 1.

INVENTOR.
GRAYDON A. PHLIEGER, JR.

INVENTOR.
GRAYDON A. PHLIEGER, JR.
BY
William H. King
ATTORNEYS.

INVENTOR.
GRAYDON A. PHLIEGER, JR.
BY
William H. King
ATTORNEYS.

United States Patent Office 3,433,909
Patented Mar. 18, 1969

3,433,909
SEPARATION SIMULATOR
Graydon A. Phlieger, Jr., Merritt Island, Fla., assignor to the United States of America as represented by the Administrator of National Aeronautics and Space Administration
Filed Aug. 24, 1967, Ser. No. 663,180
U.S. Cl. 200—82     10 Claims
Int. Cl. H01h 35/38

ABSTRACT OF THE DISCLOSURE

An apparatus for selectively separating electrical circuits for simulating interstage separation of a flight vehicle. The electrical cables from one stage are connected to one set of the simulator's test cables, while those from the next stage are connected to the other set. Each set of cables is attached to connectors in the simulator. Female connectors for one set are mounted on a fixed plate, while male connectors for the other set are mounted on a movable plate. The plates are selectively separated and remated so that functions that occur at stage separation can be simulated during preflight checkout of the space vehicle.

---

The invention described herein was made by an employee of the United States Government, and may be manufactured and used by or for the Government for governmental purposes without the payment of any royalties thereon or therefor.

This invention relates to a device for selectively separating a plurality of electrical circuits, and more particularly to a device for simulating the separation of stages of a flight vehicle so that the functions that occur at stage separation can be simulated during preflight checkout.

In many electrical circuits which are coupled together, it is frequently desired that the circuits be separated for various reasons. This is especially true in the space program wherein, extensive testing takes place prior to a flight vehicle being launched. One of the problem areas in launching a flight vehicle is in the functions that occur at stage separation of the various stages of the vehicle. Thus, it is extremely important that extensive tests be made of the various stages prior to launch. The device constructed in accordance with the present invention enables test engineers and the like, to simulate separation of the various stages of the flight vehicle at a test location so that the functions that occur at stage separation can be checked out.

While the separation simulator is being described in conjunction with a space vehicle, it is to be understood that such could be used in connection with many electrical circuits.

Another advantage of the device constructed in accordance with the present invention is that positive separation and remating of electrical circuits can be remotely controlled.

In accordance with the present invention, it has been found that difficulties encountered in apparatus for separating and remating electrical circuits may be overcome by providing a novel apparatus for simulating the separation of the circuits. This apparatus includes the following basic parts: (1) A first connector plate, (2) a plurality of electrical connectors carried on the first connector plate, (3) conductors are provided for electrically connecting one of the circuits to the connectors on the first connector plate, (4) a second connector plate is slidably mounted for movement relative to the first connector plate, (5) a plurality of electrical connectors are carried on the second connector plate for connection with the connectors on the first connector plate, (6) conductors are provided for electrically connecting other circuits to the connectors on the second connector plate, (7) the connectors carried on the first and second connector plates have complementary connection terminals for completing electrical connection therebetween when brought into contact, (8) the first connector plate has an opening in the medial portion thereof, (9) pawls are pivotally mounted on the first connector plate and extend through the opening for latching the second connector plate to the first connector plate wherein electrical connection is made between the connectors carried on the plates, (10) a power operated striker is carried in alignment with the opening in the first connector plate for engaging the pawls to unlatch the first connector plate from the second connector plate and to strike the second connector plate for separating the plates to break electrical connection therebetween when the striker is moved in one direction, and (11) an abutment is carried on a rod directly below the striker for engaging the second connector plate to move such towards the first connector plate responsive to the striker being moved in the opposite direction from that during the unlatching operation. When the connector plates are brought into contact the pawls latch the plates together to insure a continuous electrical connection between the connectors carried thereon.

Accordingly, it is an important object of the present invention to provide an apparatus for simulating interstage separation of a pair of stages of a flight vehicle or the like, so that functions which occur at stage separations can be simulated during preflight checkout.

Another important object of the present invention is to provide a simple and effective device for separating and remating electrical connections between a plurality of circuits.

Still another important object of the present invention is to provide a latching mechanism for holding a pair of connector plates together, and a striker mechanism which operates to release the latching mechanism and force the connector plates apart to break electrical connection between connectors carried on the plates.

Still another important object of the present invention is to provide a device for separating a plurality of electrical circuits that utilize condition responsive devices which produce signals indicative of the position of the connector plates.

A further important object of the present invention is to provide a pneumatically controlled device for separating connector plates having a plurality of connectors mounted thereon responsive to command signals.

Other objects and advantages of this invention will become more apparent from a reading of the following detailed description and appended claims taken in conjunction with the accompanying drawings wherein:

Figure 1:
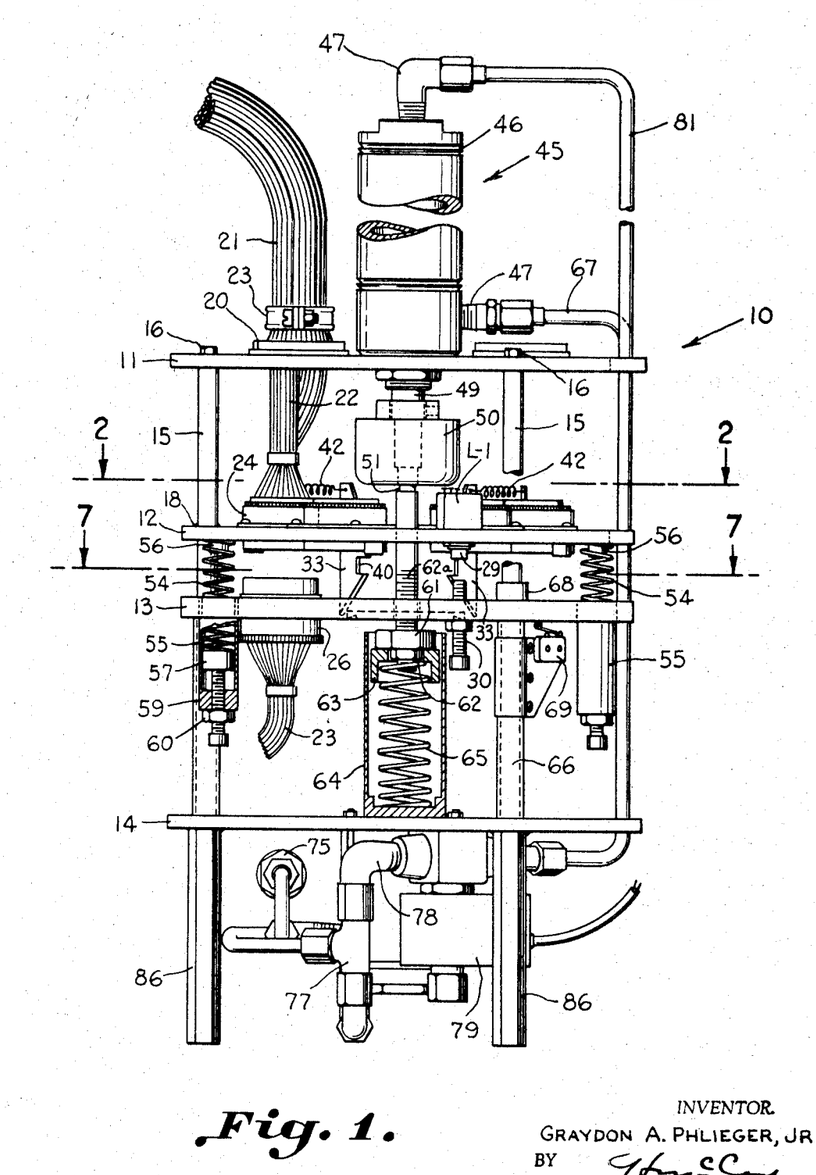
FIGURE 1 is an elevational view, partially in section, with parts removed illustrating an apparatus for separating a plurality of electrical connectors.

Referring in more detail to the drawings wherein like reference numerals designate identical or corresponding parts throughout the views, and with special attention to FIGURE 1, reference numeral 10 generally designates the simulating apparatus which is utilized to separate a plurality of electrical circuits. A top plate 11, a first plate or connector plate 12, a second plate or striker plate 13, and a bottom plate 14 are carried by three circumferentially spaced vertical legs 15. The top plate is secured to the top of the vertical legs 15 by bolts 16. The vertical legs extend through apertures 17 provided in the connector plate 12 and are secured thereto by any suitable means, such as the weld 18. The second plate or striker plate 13 has apertures 19 provided therein for receiving the vertical legs 15 and are slightly larger than the vertical legs so that the striker plate 13 can move in a vertical direction during separation and remating of the connector and striker plates 12 and 13, respectively. The bottom plate 14 is secured to the vertical legs 15 by any suitable means, such as by welding.

The top plate 11 has six circumferentially spaced openings 20 through which trunk lines 21 pass. When the simulating apparatus is being used to check out various stages of a flight vehicle a portion 22 of the conductors in trunk line 21 are connected to one stage while another portion 23 are connected to electrical circuits of another adjoining stage. The clamp 23 is provided for maintaining the conductors ganged.

Figure 8:
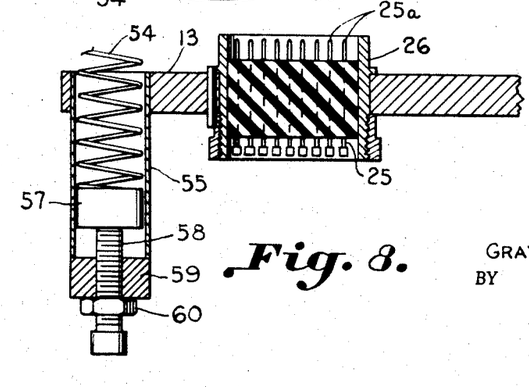
FIGURE 8 is a cross-sectional view taken along line 8—8 of FIGURE 7 illustrating a connector carried on the striker plate and a spring which aids in separating the connector plate from the striker plate.

The portion 22 of the conductors are electrically connected to one side of electrical terminals carried within a connector 24 mounted on the first or connector plate 12. The connector 24 extends through the connector plate 12 so as to expose therebelow the other end of the connector terminals, which are female fittings. The other portion 23 of the conductors are electrically connected to one end of terminals 25 carried within a complementary connector 26 mounted in the striker plate 13. The other side of the terminals 25 are male terminals 25a (see FIGURE 8) which fit into the complementary female terminals carried within the connector 24 on the connector plate 12.

It is noted that the other portion 23 of the conductors from the trunk lines 21 are fed through openings 27 in the connector plate 12, and complementary openings 28 in the striker plate to connect with the bottom side of the connectors 26.

Three microswitches L–1, L–2 and L–3, respectively, are mounted on the connector plate and have a control button 29 which extends through the connector plate so that such can be pushed in by an adjustable bolt 30 carried on the striker plate when the connector plate 12 and striker plate 13 are brought together. Each of the microswitches L–1 through L–3 have an adjustable bolt positioned directly therebelow on the striker plate 13.

The first connector plate 12 has a circular opening 31 in the medial portion thereof. A latching mechanism, generally designated at 32, is carried by the first connector plate 12 and engages the striker plate 13 for holding the two plates together so that electrical connection is maintained between the connectors 24 and 26 carried on the respective plates. The latching mechanism includes three circumferentially spaced pivotal pawls 33 which extend through the opening 31 in the connector plate and slots 34 provided in the striker plate 13 to hold the two plates together. The pawls are pivotally mounted on pins 35 carried between the ends of a bifurcated member 36 mounted on the connector plate 12. The other end of the bifurcated member is secured in fixed relationship to the connector plate 12 by bolts 37. The bolts 37 also secure an upturned metal angle piece 38 to the bifurcated member 36.

Figure 2:
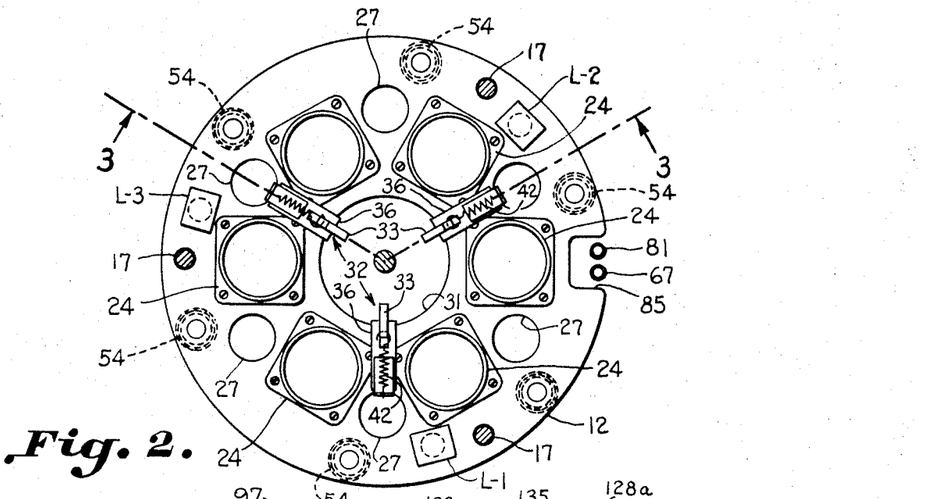
FIGURE 2 is a plan view taken along line 2—2 of FIGURE 1 illustrating a first connector plate, hereinafter, sometimes referred to as connector plate.
Figures 2A, 3:
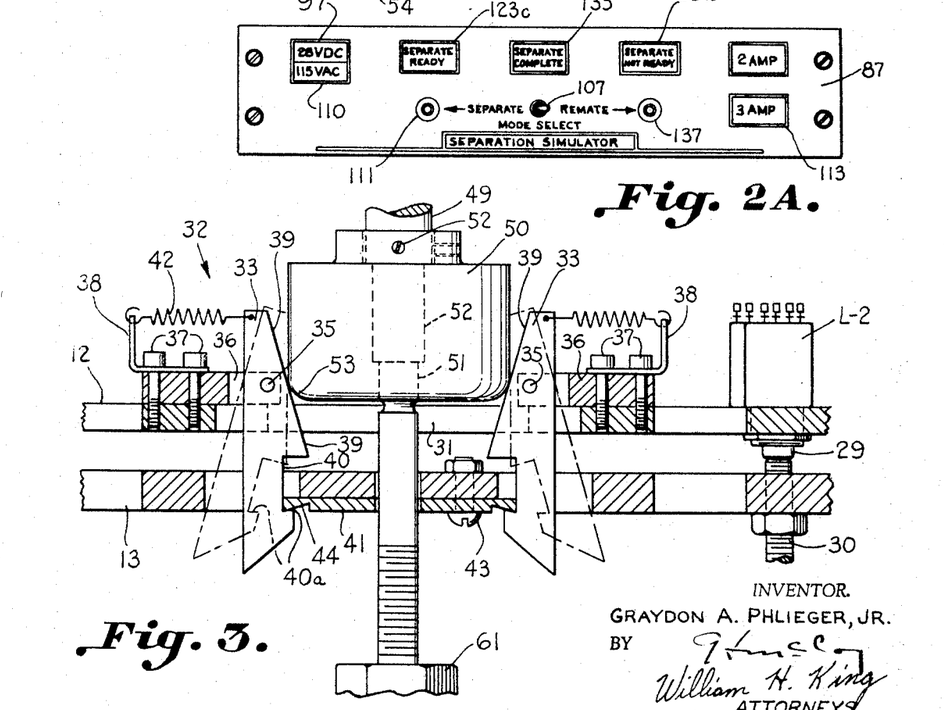
FIGURE 2A is a front elevational view of a control panel for the apparatus.
FIGURE 3 is a sectional view taken along line 3—3 of FIGURE 2 illustrating a striker mechanism, a portion of the first connector plate, and a portion of the second connector plate, hereinafter, sometimes referred to as the striker plate.

The front or inner surfaces 39 of the pawls 33 are inclined inwardly at an angle. A notch 40 is provided adjacent the lower end of the pawls 33 for engaging a pawl latch plate 41 which is inset in the bottom of the striker plate 13. Shims can be inserted or removed from under the latching plate 41 to vary the distance between the striker and connector plate when the two are mated. If the latching plate 41 is too high, the striker plate 12 will be unable to latch, and insufficient shimming will keep the connectors from engaging properly. A spring 42 is connected between the upper end of the pawls 33 and a respective angle piece 38 to maintain the pawls 33 in the full line or latched position shown in FIGURE 3. The pawl latch plate 41 is secured to the underside of the striker plate 13 by any suitable means, such as bolts 43, and has a recessed upwardly inclined circumferential notch 44 which receives the lower flange 40a at the base of the notch 40 of the pawl 33 when the pawl is in the latched or full line position as shown in FIGURE 3.

A power operated means, generally designated at 45, is provided upon energization for engaging the latching mechanism 32 so as to release the striker plate and to force the striker plate 13 and the connector plate 12 apart breaking electrical connection between the connectors 24 and 26 carried on the plates. The power operated means includes a pneumatic cylinder 46 having a port 47 adjacent the top thereof, and another port 48 adjacent the bottom thereof. The pneumatic cylinder 46 is mounted in upright position on the top plate 11 by any suitable means. A piston 49a (FIGURE 6) is carried within the cylinder and has a rod 49 depending therefrom and extending through an aperture provided in the medial portion of the top plate 11. A cylindrical shaped striker 50 having an axial bore therethrough with a recessed portion (not shown) adjacent the bottom thereof is carried on the rod 49. The piston rod 49 has a complementary recessed portion 51 which fits within the recessed portion of the striker and an enlarged portion 52 integral therewith located directly above the recessed portion 51. The striker 50 slips on the rod and the portion of the striker adjacent the recessed portion of the shaft 49 abuts against the enlarged portion 52 of the shaft to prevent such from slipping upwardly. The striker is also secured to the rod 49 by a setscrew 52. The bottom edge 53 of the striker is rounded for engaging the inclined surface 39 of the pawls when such is moved downwardly. When a suitable gas, such as nitrogen or air, is supplied to the top port 47 of the pneumatic cylinder 46 the piston therein forces the piston rod 49 downwardly. The striker 50 engages the pawls 33 pivoting such to the broken line position illustrated in FIGURE 3 unlatching the striker plate 13. The striker continues in its downward path until such engages the striker plate 13 separating the striker plate 13 from the connector plate 12. When the connector plate 12 and the striker plate 13 separate the electrical connection is broken between the connectors 24 and 26. Six circumferentially spaced vertical springs 54 are carried between the striker plate 13 and the connector plate 12 for aiding in separating the plates 12 and 13. The springs 54 are carried within a cylindrical housing 55 and extend through an opening in the striker plate and are held in position against the bottom of the connector plate 12 by downwardly extending posts 56. The bottom of the spring 54 rests on a plug 57 which is carried on top of an adjustable bolt 58. The bolt is threaded in the bottom 59 of the cylindrical housing 55 and has a lock nut 60 threaded thereon for adjusting the tension in the spring 54. The initial shock of the striker 50 engaging the striker plate 13 breaks the pins 25a of the connectors 26 loose from the female connectors of connector 24 overcoming the initial friction therebetween enabling the springs 54 to separate the connector plate 12 from the striker plate 13. The combination of such enables smaller springs 54 to be utilized.

An abutment in the form of a nut 61 is carried on the bottom of the piston rod 49, and a lock nut 62 is also carried on the rod for preventing the nut from rotating on the threaded portion 62a adjacent the bottom of the piston rod 49. The nut 61 rests on top of a movable cup-shaped cover 63, which is permitted to ride up and down within a cylinder 64 disposed in alignment with the piston rod and mounted on the bottom plate 14. A return spring 65 is carried within the cylinder 64 and is compressed on the downward stroke of the rod 49 by the abutment 61 pressing against the movable covers 63. After the downward stroke of the striker 50 is completed the fluid within the cylinder is allowed to bleed off and the return spring 65 forces the piston rod upward until the piston is centered within the cylinder 46. The return spring 65 also keeps the striker 50 from resting on the pawl assembly when the plates are mated.

Sleeves 66 are carried on the vertical legs 15 between the striker plate 13 and the bottom plate 14 for limiting the downward movement of the striker plate 13. The holes 19 within the striker plate closely encompass the vertical legs 15 so that the top of the sleeve 66 will engage the bottom surface of the striker plate 13, such as illustrated in FIGURE 1.

When it is desired to remate the connectors 24 and 26 fluid is supplied through line 67 into the bottom port 48 of the pneumatic cylinder 46 forcing the piston upward. Such causes the abutment 61 to engage the bottom surface of the striker plate pulling such upward until the connectors 24 and 26 are mated. Upper stops in the form of sleeves 68 are carried on the vertical legs 15 between the connector plate 12 and the striker plate 13 for limiting the upward movement of the striker plate 13. The sleeves 68 are allowed to slide freely on the vertical legs 15. It is also noted that on the up stroke of the striker plate 13 threaded bolts 30 engage the control button 29 of the microswitches L-1, L-2 and L-3 causing the microswitches to be opened indicating that the connectors 24 and 26 are in electrical contact and separation is ready.

A microswitch 69 is also mounted on the vertical leg 15 below the striker plate 13 so that when the striker plate is separated from the connector plate 12 such will be opened preventing the "separate solenoid" 79 from being energized.

Figure 4:
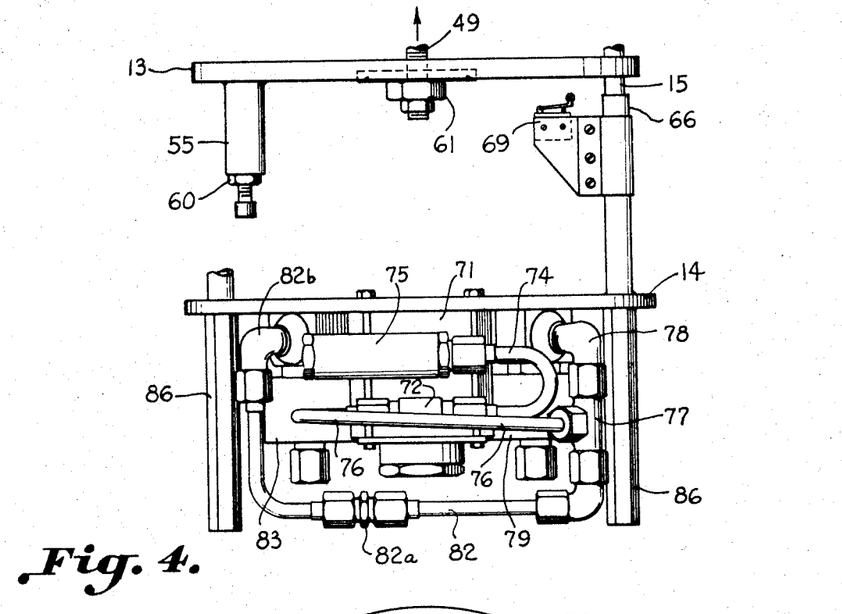
FIGURE 4 is a side elevational view illustrating the lower portion of the simulating apparatus and particularly the pneumatic components carried adjacent the base of the apparatus.
Figure 5:
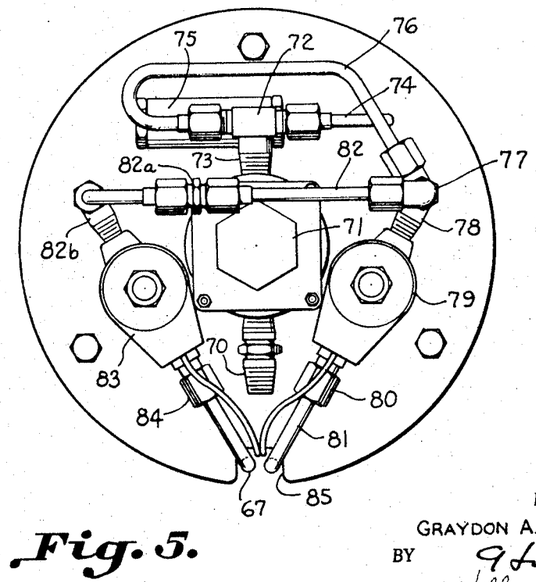
FIGURE 5 is a plan view looking from the bottom of the apparatus illustrating the pneumatic fittings and solenoid valves used for operating the apparatus.
Figures 6, 7:
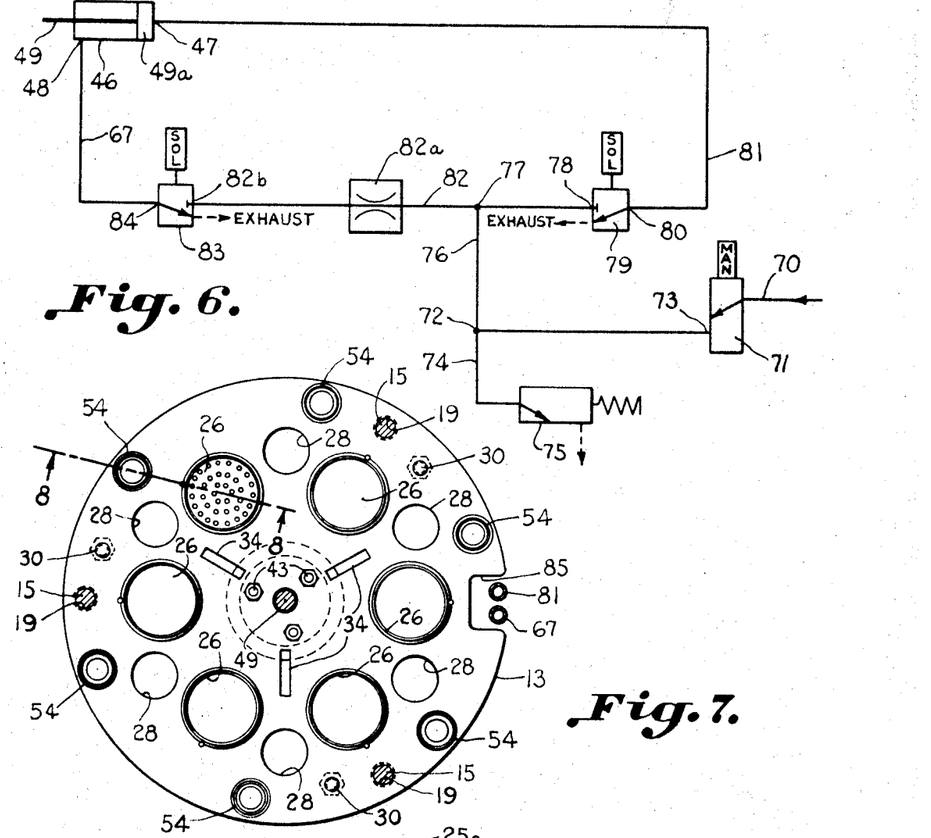
FIGURE 6 is a schematic diagram of the pneumatic circuit for the apparatus.
FIGURE 7 is a plan view taken along line 7—7 of FIGURE 1 illustrating the striker plate.

The pneumatic system for operating the cylinder 46 is illustrated schematically in FIGURES 4, 5 and 6. Gas is supplied to an inlet port 70 of a pressure regulator 71 from any suitable source, such as a pressurized bottle or a pressurized line. The pressure of the gas being supplied is above 200 pounds per square inch, and is reduced by the pressure regulator 71 to approximately 200 psi. The pressure regulator 71 is suitably mounted on the underside of the base plate 14. A T-joint 72 is connected to the exit port 73 of the pressure regulator and one side of the T-joint is connected through conduit 74 to a relief valve 75 which opens at approximately 215 psi to insure that the simulator does not receive excess pressure. The other side of the T-joint 72 is connected by a conduit 76 to another T-joint 77. One side of the T-joint 77 supplies gas to an input port 78 of a conventional solenoid valve 79. The solenoid valve 79 is normally closed on the inlet side and normally open on the output side so that when such is de-energized gas is allowed to exhaust therefrom. The output port 80 of the solenoid valve 79 is coupled by means of conduit 81 to the top port 47 of the cylinder 46. Thus, when solenoid valve 79 is energized by applying 110 volts A.C. thereto, gas is supplied to the top port 47 of the cylinder 46 causing the piston therein to move downwardly to separate the connector plate 12 from the striker plate 13. After separation has been accomplished the solenoid valve is de-energized and the gas in the cylinder 46 is allowed to bleed off through the exhaust port of the solenoid valve 79. This permits the return spring 65 to center the piston within the cylinder 46. On the remate stroke gas is supplied from the pressure regulator 71 through the T-joint 72, conduit 76, T-joint 77, conduit 82, and a damper 82a through an input port 82b of a "remate solenoid" valve 83. When the "remate solenoid" valve 83 is energized the gas is allowed to flow therethrough out the exit port 84 and through conduit 67 into the lower port 48 of the cylinder 46. This causes the piston carried within the cylinder 46 to move upwardly and, in turn, remate the striker plate 13 with the connector plate 12. The remate damper 82a is an orifice with a small diameter hole therein mounted in a union. It restricts the gas flow to the remate side of the cylinder and thus makes the remate stroke much slower than the separate stroke to prevent connector damage. It is noted that the conduits 67 and 81 leading from the solenoid valves are fed through notches 85 provided in the bottom plate 14, the striker plate 13, the connector plate 12, and the top plate 11. The simulator is supported on three circumferentially spaced vertical legs 86. The legs 86 are secured to the underside of the bottom plate 14 by any suitable means, such as welding, and extend below the piping of the pneumatic system for preventing damage to the pneumatic piping, as well as for supporting the simulator.

Figure 9:
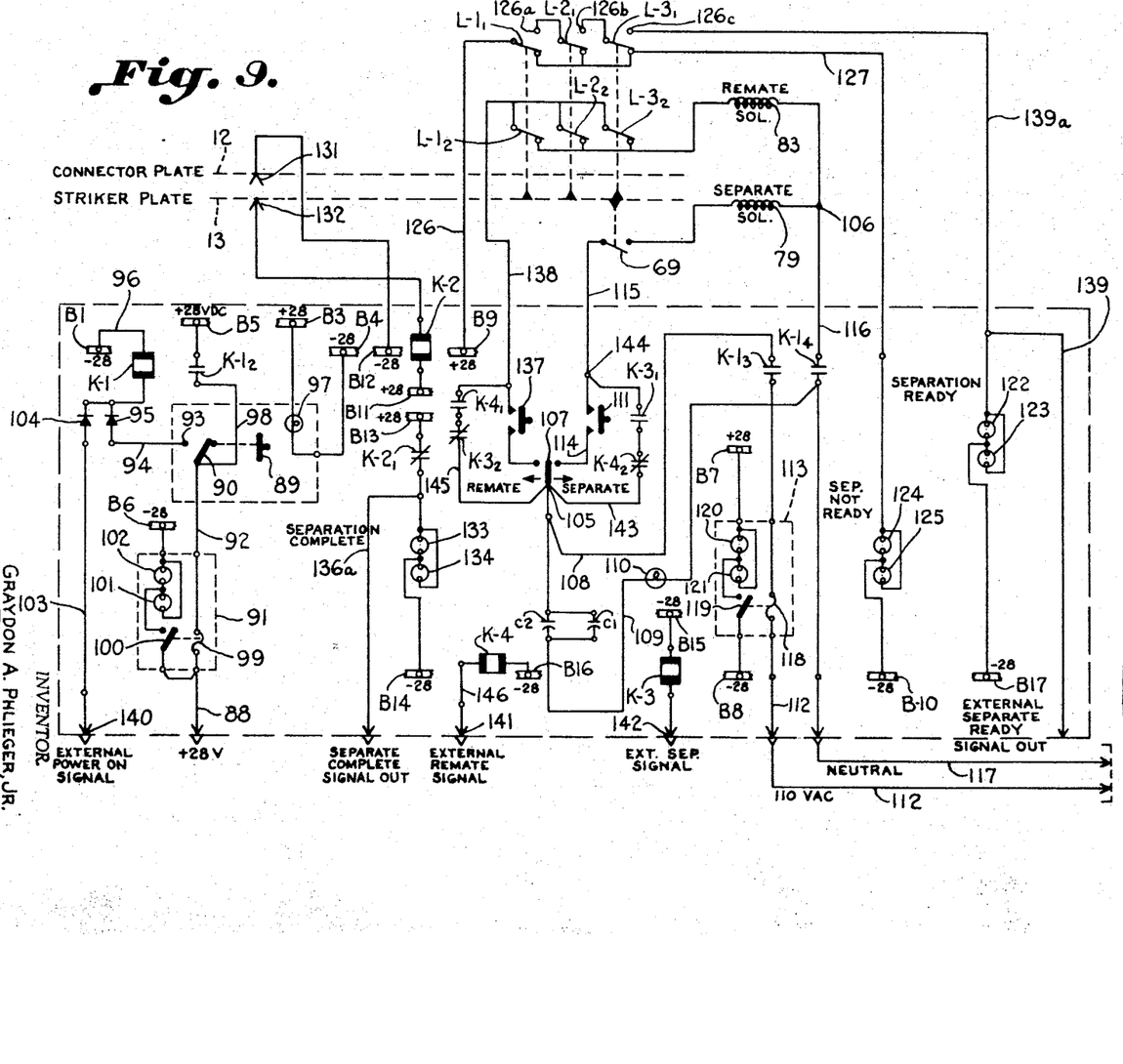
FIGURE 9 is a schematic diagram of the electric controls for the apparatus.

The simulator is provided with electrical controls so that such can be operated at a remote location by merely manipulating control switches carried on a control panel, such as illustrated in FIGURE 9.

FIGURE 2A illustrates the control panel, generally designated by reference character 87, which contains 28 volts D.C. power circuits for its relays and indicators and 110 volts A.C. circuits for the simulator solenoids 79 and 83, together with the necessary switches, relays, and indicators. Its operation will be discussed in conjunction with the schematic circuit for the simulator illustrated in FIGURE 9.

In order to activate the simulator a plus 28 volts D.C. signal is supplied from any suitable source to lead 88. When the power switch 89 is closed the lever arm 90 is moved to the left allowing current to flow through lead 88, fuse box 91, lead 92, junction 93, lead 94, diode 95 energizing relay K-1, out the relay coil K-1 through lead 96 to the bus bar B1, which is connected to the negative side of the 28 volts D.C. source. Upon closing switch 89, bus bars B3, B5, B7, B9, B11, B13 are connected to the positive side of a 28 volt source (not shown) and bus bars B1, B4, B6, B8, B10, B12, B14, B15, B16, and B17 are connected to the negative side of the 28 volt source. In order to aid in understanding the circuit such shall hereinafter be referred to as positive 28 volts applied thereto, and a negative 28 volts applied thereto. All of the bus bars either have a 28 volt signal applied thereto, with the exception of those having the 110 volt A.C. signal connected thereto. When the switch 89 is closed such causes current to flow from the bus bar B3, which has a positive 28 volts applied thereto through lamp 97, and to the negative bus bar B4. When lamp 97 is illuminated such indicates that 28 volts is applied to the system. The closing of power switch 89 allows current to flow from the plus 28 volts bus bar B5 through contact K-1$_2$ which was closed by energization of relay coil K-1 through lead 98 to terminal 93 and back to the negative bus bar B1. Such seals in the circuit to the relay K-1. The fuse box 91 has a fuse element 99 interposed in lead 88 which is operably connected to contact switch 100. When the fuse element 99 burns out or breaks the contact lever 100 moves to the left allowing current to flow from the positive 28 volts supplied to lead 88 through the contact lever 100 illuminating lamps 101 and 102. When lamps 101 and 102 are illuminated such shows up on the control panel by the illumination of the panel labeled "2 amp."

It is noted that the lamps 101 and 102 are connected in parallel so that if one burns out the other will still illuminate. The other sides of the lamps are connected to the negative 28 volt bus bar B6.

The control panel is so provided to receive and transmit signals to an external source so that it can be operated either internally or from external signals. The previously mentioned power circuit including relay K–1 could be energized from an external power signal which would be supplied from any suitable source to lead 103 through diode 104 energizing relay K–1 and to the negative bus terminal B1. When the relay K–1 is energized other contacts which will be described later are activated placing the simulator in condition to receive either external signals or manually operated signals, such as pushing the push buttons on the control panel 87.

When relay K–1 is energized contacts K–1$_3$ and K–1$_4$ are closed allowing 110 volts A.C. power to be placed on terminal 105 of the mode select switch 107. The neutral portion of the 110 volt circuit is coupled to junctions 106. The closing of contacts K–1$_3$ and K–1$_4$ also places 110 volts A.C. on capacitors C1 and C2 by means of current flowing through leads 108 and 109. The capacitors drop the voltage and cause signal lamp 110 to be illuminated by a low voltage. When signal lamp 110 is illuminated such indicates that the 110 volt portion of the circuit is operating.

The contacts and especially microswitch 69 are illustrated in the position they would assume when the connector plate and the striker plate are separated. Since power is always on the mode select switch 107, its position determines whether the "remote solenoid" valve 83 or "separate solenoid" valve 79 will operate when local control is used. To separate the connector plate 12 from the striker plate 13 the mode select switch 107 is held to the right side, while push button 111 is depressed, applying power to "separate solenoid" 79 through microswitch 69. The striker plate moves downward when the "separate solenoid" is energized and opens microswitch 69 when it reaches the striker plate stops 66. Such removes power from the "separate solenoid" 79 which then returns to its normal position. When the "separate" push button 111 is depressed, current flows through lead 112, fuse box 113, closed contact K–1$_3$, junction 105, mode select switch 107, lead 114, push button 111, lead 115, microswitch contact 69, "separate solenoid" 79, and is returned through lead 116, contacts K–1$_4$ to the neutral lead 117. Any suitable 110 volt power source is connected between leads 112 and 117. The fuse box 113 is identical in operation with the fuse box 91 and includes a fuse element 118. When the fuse element 118 breaks contact arm 119 closes allowing current to flow from the positive 28 volt bus bar B7 through lamps 120 and 121 which are connected in parallel to the negative 28 volt bus bar B8. When lamps 120 and 121 are illuminated such illuminates the box labeled 3 "amp" on the control panel 87.

The microswitches L–1, L–2 and L–3, respectively, close or move to the position illustrated in FIGURE 10 when the connector plate separates from the striker plate. Each of the microswitches has a pair of contacts. The contacts associated with the microswitch L–1 are L–1$_1$ and L–1$_2$. The contacts associated with the microswitch L–2 are L–2$_1$ and L–2$_2$. The contacts associated with microswitch L–3 are L–3$_1$ and L–3$_2$. Closing any one of the upper set of contacts L–1$_1$, L–2$_1$ or L–3$_1$, which are wired in series, switches 28 volts D.C. from the "separation ready" indicator, fuse lights 122 and 123, to the "separation not ready" indicator, fuse lights 124 and 125. Thus, when the contacts L–1$_1$, L–2$_1$ and L–3$_1$ are in the position as illustrated in FIGURE 9 during the time the connector plate 12 and striker plate 13 are separated current flows from the plus 28 volt bus bar B9 through lead 126, contact L–1$_1$, lead 127 through the lamps 124 and 125 to the negative 28 volt bus bar B10. When lamp 124 or 125 is illuminated such shows up on the control panel 87 by the illumination of the "separate not ready" panel 128$a$.

It is noted that if any one of the contacts L–1$_1$, L–2$_1$ or L–3$_1$ is in the position illustrated in FIGURE 9 such will cause the "separate not ready" lamps 124 and 125 to be illuminated.

When the connector and striker plates 12 and 13 are separated the 28 volt D.C. circuit from bus bar B11 to the negative 28 volt bus bar B12, which includes relay coil K–2, is broken due to the separation of connector 131 carried on the connector plate 12 and the connector 132 carried on the striker plate 13. When relay K–2 is de-energized contact K–2$_1$ is closed completing the "separation complete" circuit. Current flows from positive 28 volt bus bar B13 through closed contact K–2$_1$ and through lamps 133 and 134 to the negative volt bus bar B14. The lamps 133 and 134 are connected in parallel. The 28 volt signal produced when relay K–2 is de-energized is also supplied via lead 136$a$ to any suitable external equipment to indicate that the separation has been completed.

For local control, holding the mode select switch 107 to the remate side and pressing remate push button 134 operates the "remate solenoid" 83 through the lower sets of contacts L–1$_2$, L–2$_2$, and L–3$_2$. Since these contacts are wired in parallel, the "remate solenoid" 83 will continue the remate stroke until the striker plate 13 opens all three contacts as it remates with the connector plate 12. The "remate solenoid" 83 shuts off and returns to its normal position when all three contacts L–1$_2$, L–2$_2$ and L–3$_2$ are open. In order to energize the "remate solenoid" 83 current flows through leads 112, fuse box 113, closed contacts K–1$_3$, mode switch 107, bush button 137, lead 138, at least one of the contacts L–1$_2$, L–2$_2$ or L–3$_2$, "remate solenoid" 83 and back through lead 116 to the other side of the 110 volt source.

When all three of the upper sets of contacts L–1$_1$, L–2$_1$ and L–3$_1$ open they switch 28 volts D.C. from the separate "not ready" to the "separate ready" indicator, and also to external equipment through lead 139. The separate "not ready" lights 124 and 125 will stay on if the striker plate 12 does not open all three contacts. When the "separation ready" circuit is energized current flows from bus bar B9, lead 126, the upper set of terminal 126$a$, 126$b$, 126$c$, lead 139$d$, fuse box 122$a$ to negative 28 volt bus bar B17. When lamps 122 and 123 are illuminated such illuminates the "separate ready" panel 123$c$ on the control panel 87. Remating the connector plate 12 and the striker plate 13 also closes the circuit across the relay coil K–2 which causes contact K–2$_1$ to open. This extinguishes the "separate complete" indicator lamps 133 and 134, and stops the "separation complete" signal being supplied to the external equipment through lead 137.

The separation and remate cycles can be initiated by an external signal, as well as from the control panel 87 by a positive 28 volt D.C. signal entering at junctions 140, 141 or 142. When a positive 28 volt D.C. signal is supplied to lead 103 such causes relay K–1 to be energized in the same manner as if the push button 89 had been depressed. After the signal has been received energizing the relay coil K–1, if an external signal of a plus 28 volts is supplied to junction 142, such will cause the relay coil K–3 to be energized due to current flowing from the positive 28 volt external signal to the negative 28 volt bus bar B15. Actually, all of the negative 28 volt bus bars are a common lead. When relay coil K–3 is energized such closes contact K–3$_1$ completing the circuit around the separate push button 111. Thus, current would flow from junction 105 by-passing the mode select switch 107 through lead 143, closed contact K–4$_2$, closed contact K–3$_1$ and to junction 144. It is, also, noted that when relay coil K–3 was energized contact K-3₂ interposed in lead 145, which shunts the push button 137, is open preventing energization of the "remate solenoid" 83.

In order to cause remate of the connector plate 12 and the striker plate 13 by an external signal a plus 28 volt external signal is supplied to junction 141 from any suitable source through lead 146 energizing relay coil K-4 to the negative 28 volt bus bar B16. When the relay coil K-4 is energized such closes the normally open contact K-4₁ in the circuit shunting the remate push button 137. It also causes contact K-4₂ in the "separate" shunting circuit to be open. When the circuit is completed around the mode switch 107 and the remate push button 137 such initiates the remate cycle. It is noted that the "remate" and "separate" cycles cannot be initiated simultaneously by external signals since when one is energized it opens the circuit for the other.

The circuit has been described using particular voltages for the sole purpose of aiding in understanding the invention, however, any suitable voltage could be utilized. While a preferred embodiment of the invention has been described using specific terms, such description is for illustrative purposes only, and it is to be understood that changes and variations may be made without departing from the spirit or scope of the following claims.

What is claimed is:

1. A device for selectively opening and closing a plurality of electrical circuits for simulating separation of stages of a missile and the like to test the electrical systems of such stages comprising:
   (A) a first connector plate;
   (B) a plurality of electrical connectors carried on said first connector plate;
   (C) means for electrically connecting said systems of one stage to said electrical connectors on said first connector plate;
   (D) a second connector plate;
   (E) a plurality of electrical connectors carried on said second connector plate for connection with said connectors on said first connector plate;
   (F) means for electrically connecting said systems of another stage to said electrical connectors on said second connector plate;
   (G) said connectors carried on said first and second connector plates having complementary connection terminals for completing electrical connection therebetween when brought into contact;
   (H) latching mechanism carried by one of said connector plates and engaging the other for holding said connector plates together so that electrical connection is maintained between said connectors on said first and second connector plates;
   (I) power operated means provided for selective energization engaging said latching mechanism so as to release said connector plates and to force said connector plates apart breaking electrical connection between said connectors carried on said first and second connector plates, and
   (J) said power operated means provided for selective energization moving said connector plates together for making electrical contact between said connectors carried thereon,
   (K) whereby said power operated means is selectively operated to separate and remate said connectors carried on said connector plates for opening and closing the electrical connection therebetween.

2. The device as set forth in claim 1 wherein:
   (A) said first connector plate has an opening in the medial portion thereof; and
   (B) said latching means includes pivotally mounted pawls circumferentially spaced on said first connector plate extending through said opening for engagement with said second connection plate.

3. The device as set forth in claim 2 wherein said power operated means includes:
   (A) a fluid operated cylinder having ports adjacent opposite ends thereof;
   (B) a piston carried in said cylinder moving responsive to fluid entering said cylinder;
   (C) a rod depending from said piston;
   (D) a striker carried on said rod;
   (E) said striker being aligned with said opening for engaging said pawls as such passes through said opening in said connector plate releasing said pawls for engagement with said second connector plate as fluid flows into one port of said cylinder; and
   (G) said striker contacting said second connector plate separating such from said first connector plate responsive to said fluid flowing into said one port.

4. The device as set forth in claim 2 wherein:
   (A) springs are resiliently biased between said first and second plates for aiding in separating same when said latching mechanism is disengaged.

5. The device as set forth in claim 2 wherein:
   (A) solenoid valves are interposed in fluid lines coupled to said ports on said cylinder for selectively controlling the flow of fluid into said cylinder.

6. The device as set forth in claim 5 wherein:
   (A) an electrically operated control circuit is coupled to said solenoid valves for selectively energizing such.

7. The device as set forth in claim 6 wherein:
   (A) condition responsive devices are carried on said device for generating signals indicating whether said connectors are electrically mated or separated.

8. The device as set forth in claim 3 wherein:
   (A) said second connector plate has an opening therein;
   (B) said rod extends through said second connector plate;
   (C) an abutment carried on said rod on the opposite side of said second connector plate from said striker; and
   (D) said abutment engaging said second connector plate moving such toward said first connector plate causing said connectors carried thereon to make electrical connection responsive to fluid flowing into another port of said cylinder.

9. A device for selectively opening and closing electrical connections between a plurality of electrical circuits comprising:
   (A) a first connector plate;
   (B) a plurality of electrical connectors carried on said first connector plate;
   (C) means for electrically connecting one of said circuits to said connectors on said first connector plate;
   (D) a second connector plate slidably mounted for movement relative to said first connector plate;
   (E) a plurality of electrical connectors carried on said second connector plate for connection with said connectors on said first connector plate;
   (F) means for electrically connecting another of said circuits to said connectors on said second connector plate;
   (G) said connectors carried on said first and second connector plates having complementary connection terminals for completing electrical connection therebetween when brought into contact;
   (H) said first connector plate having an opening in the medial portion thereof;
   (I) pawls pivotally mounted on said first connector plate extending through said opening for latching said second connector plate to said first connector plate wherein electrical connection is made between said connectors on said first and second connector plates; and
   (J) power operated striker means carried in alignment with said opening in said first connector plate for engaging said pawls unlatching said first connector plate from said second connector plate and striking said second connector plate separating said connector plates to break electrical connection therebetween as said striker means is moved in one direction.

10. The device as set forth in claim 9 wherein:
(A) said power operated striker means includes a fluid operated cylinder, and
(B) a striker carried on a piston rod operably carried by said cylinder;
(C) said piston rod extending through said second connector plate;
(D) an abutment carried on said piston rod on the opposite side of said second connector plate from said striker; and
(E) said abutment engaging said second connector plate moving such toward said first connector plate causing said pawls to latch said connector plates together responsive to said striker means being moved in the opposite direction from said one direction.

References Cited

UNITED STATES PATENTS

| | | | |
|---|---|---|---|
| 2,911,492 | 11/1959 | Beatty | 200—82.1 |
| 3,047,697 | 7/1962 | Forwald | 200—82.1 XR |
| 3,344,249 | 9/1967 | Thomas et al. | 200—82 |
| 3,383,480 | 5/1968 | Phillips et al. | 200—153.18 XR |

FOREIGN PATENTS

| | | |
|---|---|---|
| 1,026,396 | 3/1958 | Germany. |

ROBERT K. SCHAEFER, *Primary Examiner.*

H. BURKS, *Assistant Examiner.*

U.S. Cl. X.R.

200—153